US011685538B2

(12) United States Patent
Guillois (10) Patent No.: US 11,685,538 B2
(45) Date of Patent: Jun. 27, 2023

(54) PROPULSION UNIT FOR AN AIRCRAFT, CONNECTED TO THE FUSELAGE OF SAID AIRCRAFT

(71) Applicant: Safran Nacelles, Gonfreville l'Orcher (FR)

(72) Inventor: Denis Guillois, Moissy Cramayel (FR)

(73) Assignee: Safran Nacelles, Gonfreville l'Orcher (FR)

( * ) Notice: Subject to any disclaimer, the term of this patent is extended or adjusted under 35 U.S.C. 154(b) by 206 days.

(21) Appl. No.: 16/587,887

(22) Filed: Sep. 30, 2019

(65) Prior Publication Data
US 2020/0031483 A1 Jan. 30, 2020

Related U.S. Application Data

(63) Continuation of application No. PCT/FR2018/050788, filed on Mar. 29, 2018.

(30) Foreign Application Priority Data

Mar. 30, 2017 (FR) ..................... 17/52701

(51) Int. Cl.
*B64D 27/26* (2006.01)
*B64D 27/20* (2006.01)
(Continued)

(52) U.S. Cl.
CPC ............. *B64D 27/26* (2013.01); *B64D 27/20* (2013.01); *B64D 29/04* (2013.01); *B64D 29/06* (2013.01); *B64D 2027/262* (2013.01)

(58) Field of Classification Search
CPC ........ B64D 29/08; B64D 27/26; B64D 27/20; B64D 2027/262; B64D 2027/266; B64D 29/04; B64D 29/06
See application file for complete search history.

(56) References Cited

U.S. PATENT DOCUMENTS 9,988,157 B2 * 6/2018 Lee ........................ B64D 29/08
2011/0142608 A1 * 6/2011 Derenes ................. B64D 29/08
   415/201

(Continued)

FOREIGN PATENT DOCUMENTS

EP        0596070      5/1994
EP        1493664      1/2005
(Continued)

OTHER PUBLICATIONS

International Search Report for International Application PCT/FR2018/050788, dated Jun. 20, 2018.

*Primary Examiner* — Philip J Bonzell
*Assistant Examiner* — Ashesh Dangol
(74) *Attorney, Agent, or Firm* — Burris Law, PLLC (57) ABSTRACT

An aircraft propulsion unit includes a turbojet engine, a lateral pylon connected to the fuselage of the aircraft, and a nacelle on the lateral pylon. The nacelle includes an upstream section having an air intake, a downstream section housing a reverse thrust device, and a middle section having two fan half-cowls surrounding a fan housing of the turbojet engine, and when said half-cowls are in a closed position defining an aerodynamic continuity between the upstream and downstream sections. The fan half-cowls include a maintenance half-cowl positioned under the horizontal median plane of the nacelle, able to move between the closed position and an open position allowing access to the turbojet engine for maintenance operations on the turbojet engine. The nacelle further includes at least one standby lock, designed to hold the maintenance half-cowl in a position intermediate to the closed and open positions.

16 Claims, 5 Drawing Sheets

(51) Int. Cl.
*B64D 29/04* (2006.01)
*B64D 29/06* (2006.01)

(56) References Cited

U.S. PATENT DOCUMENTS

2013/0140832 A1* 6/2013 Do ...................... E05B 65/0817
  292/177
2018/0057183 A1* 3/2018 Le Cadet .................. B64C 7/00

FOREIGN PATENT DOCUMENTS

| | | |
|---|---|---|
| EP | 2397410 | 12/2011 |
| FR | 2926285 | 7/2009 |
| FR | 3005453 | 11/2014 |
| FR | 3012114 | 4/2015 |
| FR | 3025548 | 3/2016 |

* cited by examiner

PROPULSION UNIT FOR AN AIRCRAFT, CONNECTED TO THE FUSELAGE OF SAID AIRCRAFT

CROSS-REFERENCE TO RELATED APPLICATIONS

This application is a continuation of International Application No. PCT/FR2018/050788, filed on Mar. 29, 2018, which claims priority to and the benefit of FR 17/52701 filed on Mar. 30, 2017. The disclosures of the above applications are incorporated herein by reference.

FIELD

The present disclosure relates to a nacelle for an aircraft turbojet engine intended to be connected to the fuselage of an aircraft and a propulsion unit comprising such a nacelle.

BACKGROUND

The statements in this section merely provide background information related to the present disclosure and may not constitute prior art.

An aircraft is propelled by several propulsion units each comprising a turbojet engine housed within a nacelle also accommodating a set of auxiliary actuation devices related to its operation and ensuring various functions when the turbojet engine is in operation or shut down, such as for example, a thrust reverser device.

Figure 1:
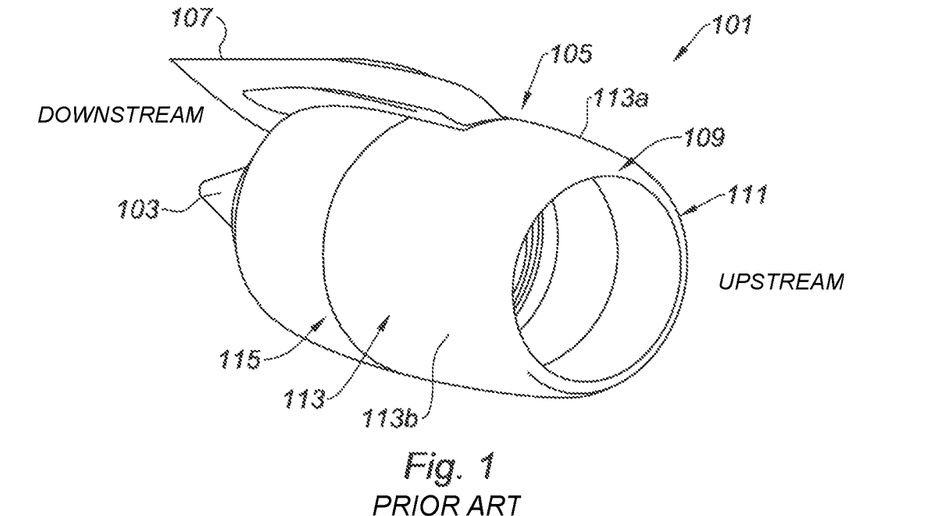
FIG. 1 is an isometric view of a propulsion unit, in the operation position, intended to hang from a wing of an aircraft according to the prior art.

A first type of propulsion unit 101 used to propel an aircraft is represented in FIG. 1. This propulsion unit 101 comprises a turbojet engine 103 and a nacelle 105, which receives the turbojet engine.

The propulsion unit 101 further includes a vertical mast 107, or pylon, intended to hang from a wing (not represented) of the aircraft, in a position called "12 O'clock" position of the propulsion unit 101.

The nacelle 105 has a tubular structure comprising an upstream section 109 defining an air inlet 111 upstream of the turbojet engine 103, a middle section 113 intended to surround a fan of the turbojet engine and a downstream section 115 which can accommodate a thrust reverser device and intended to surround the combustion chamber of the turbojet engine.

This type of propulsion unit, intended to be supported by the wings of the aircraft, typically equips short-haul type aircraft.

The middle section 113 of the nacelle 105 includes downstream of the air inlet 111 two fan half-cowls 113a, 113b surrounding a fan casing 117 (shown in FIG. 2) of the turbojet engine 103. Each fan half-cowl 113a, 113b is substantially hemicylindrical. The half-cowls 113a, 113b define, in a closed position, or closure position, as represented, an aerodynamic continuity between the air inlet 111 of the upstream section 109 of the nacelle 105 and the downstream section 115 of the nacelle.

In the closure position, the two fan half-cowls 113a, 113b are locked on a fixed structure or to one another by a set of locks, along a lower longitudinal locking line, for this use case involving a motor installation under the wings.

Figure 2:
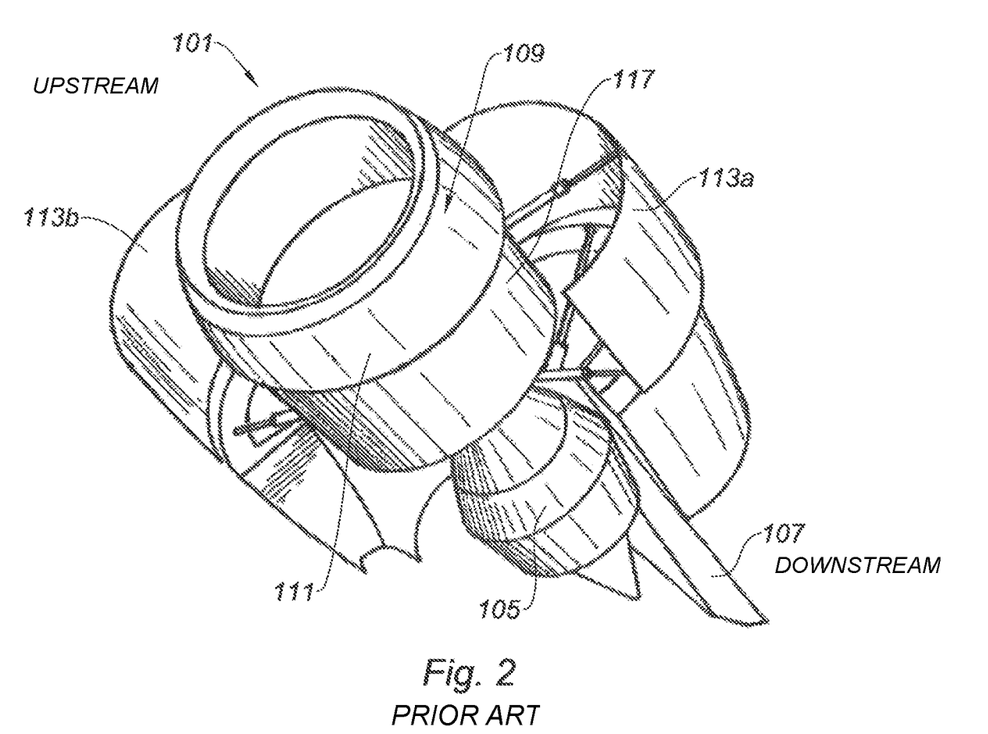
FIG. 2 represents the propulsion unit of FIG. 1 in the maintenance position.

As represented in FIG. 2, illustrating the propulsion unit 101 in the maintenance position, the fan half-cowls 113a, 113b can be opened radially by pivoting about an upper longitudinal hinge line located proximate to an axis of the mast 107 to which the nacelle 105 is attached, in order to enable access to some components of the fan casing 117 during maintenance operations.

Figure 3:
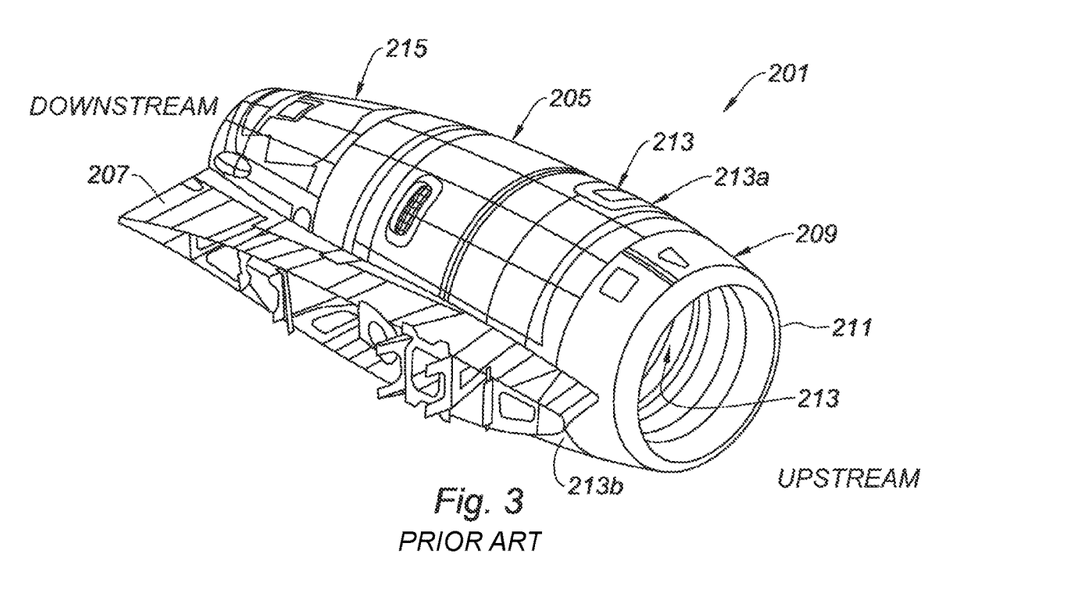
FIG. 3 is an isometric view of a propulsion unit, in the operation position, intended to be connected to the fuselage of an aircraft according to the prior art.

Referring to FIG. 3 illustrating a second type of propulsion unit 201, intended to be connected to the fuselage of the aircraft and not to the wings of the aircraft, this type of propulsion units typically equipping short-haul and medium-haul type airplanes.

This propulsion unit 1 comprises a turbojet engine 203 and a nacelle 205, which receives the turbojet engine.

The propulsion unit 201 further includes a lateral mast 207 intended to be directly connected to the fuselage (not represented) of the aircraft.

On the contrary of the vertical mast 107 object of FIGS. 1 and 2, positioned at 12 O'clock in the propulsion unit 101 and intended to hang under a wing of the aircraft, the lateral mast 207 is intended to be directly connected to the fuselage of the aircraft. To this end, the mast 207 is positioned at "9 O'clock" in the propulsion unit or, for a propulsion unit symmetrical to the propulsion unit 1 with respect to the fuselage of the aircraft, positioned at "3 O'clock" in the propulsion unit.

The nacelle 25 has a tubular structure comprising an upstream section 209 defining an air inlet 211 upstream of the turbojet engine 203, a middle section 213 intended to surround a fan of the turbojet engine and the outer conduit of the turbojet engine, a downstream section 215 which can accommodate a thrust reverser device, generally a door-type thrust reverser.

The middle section 213 of the nacelle 205 includes downstream of the air inlet 211 two fan half-cowls 213a, 213b surrounding a fan casing of the turbojet engine. Each fan half-cowl 213a, 213b is substantially hemicylindrical. The half-cowls 213a, 213b define, in a closure position as represented, an aerodynamic continuity between the air inlet 211 of the upstream section 209 of the nacelle 205 and the downstream section 215 of the nacelle.

Figure 4:
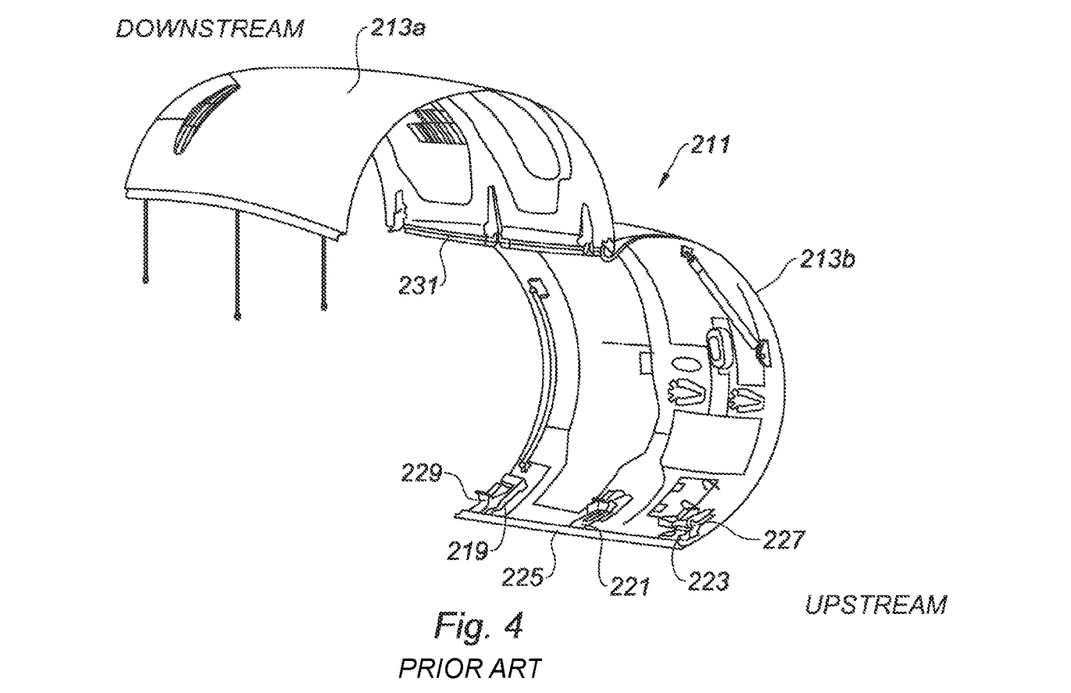
FIG. 4 is a partial view of the propulsion unit of FIG. 3 in the maintenance position.

In order to be able to carry out maintenance operations on the turbojet engine, one of the two half-cowls 213a, 213b is generally mounted movable between the closure position represented in FIG. 3 and an opening position represented in FIG. 4 to which reference is now made, enabling access to the turbojet engine.

In FIG. 4, there is represented the middle section 213 of the nacelle 205 of FIG. 3. For a better visibility, in FIG. 4, The upstream section 209 and the downstream section 215 of the nacelle 205, as well as the turbojet engine 203 and the mast 207, have been hidden.

In FIG. 4, the half-cowl 213a is in the closure position and the half-cowl 13b, also called "maintenance half-cowl" 213b, is in the opening position enabling access to the turbojet engine (not represented) to carry out maintenance operation thereon.

In the illustrated example, only the half-cowl 213b is mounted movable between the closure position and the opening position. According to a variant which is not represented, the two half-cowls 213a, 213b may be mounted movable between the closure position and the opening position.

The fan half-cowl 213b is kept closed on the mast 207 (shown in FIG. 3) thanks to a set of tension locks 219, 221, 223, disposed along the half-cowl 213b.

A fire-seal 225 is further positioned between the half-cowls 213a, 213b and the mast, in order to avoid that a fire starting in the propulsion unit propagates into the aircraft.

Moreover, a first shear lock 227 is generally disposed at the front of the movable half-cowl 213b. The shear lock 227 is designed to fasten the half-cowl 213b on the upstream section 209 of the nacelle.

A second shear lock 229, designed to fasten the half-cowl 213b on the downstream section 215 of the nacelle, is also generally disposed at the rear of the movable half-cowl 213b.

These shear locks 227, 229 are intended to provide a force path in case of breakage of one of the tension locks 219, 221, 223, in order to avoid scooping of the fan half-cowl in flight, this situation being catastrophic.

The fan half-cowl 213b can be opened radially by pivoting about a hinge line 231, positioned at "3 O'clock," a position diametrically opposite to that of the mast 207.

Thus, when it is desired to carry out maintenance operations on the turbojet engine, the fan half-cowl 213b should be opened, in order to access to the turbojet engine, and then this half-cowl should be closed once the maintenance is finished.

Opening of the maintenance half-cowl 213b is performed in the following manner.

A first operator unlocks the tension locks 219, 221, 223 and the shear locks 227, 229, which hold the half-cowl 13b in the closure position on the mast.

Meanwhile, a second operator holds the half-cowl 213b in the closure position, in order to avoid that the half-cowl 213b falls by gravity, under the effect of its own weight.

In turn, closure of the maintenance half-cowl 213b is carried out in the following manner.

The first operator displaces the half-cowl 213b from its opening position towards its closure position on the mast.

The operator exerts a large force on the half-cowl 213b, in order to firmly compress the fire-seal 225 on the mast.

The first operator forcibly holds the half-cowl 213b in this position while the second operator closes the tension locks 219, 221, 223 on the mast, and then the shear locks 227, 229, respectively on the upstream and downstream sections of the nacelle.

These phases of opening and closing the maintenance half-cowl 13b have several drawbacks.

First of all, these operations are tedious and at least two operators are necessary, both to provide opening of the maintenance half-cowl 13b and to provide closure thereof.

Indeed, during a phase of opening the maintenance half-cowl, the first operator unlocks the tension and shear locks, which hold the maintenance half-cowl in the closure position, while the second operator holds the half-cowl, in order to avoid that it falls by gravity.

During the phase of closing the maintenance half-cowl, the first operator displaces this half-cowl from its opening position towards its closure position.

When the maintenance half-cowl is in its closure position, this operator has to exert a considerable pressure in order to provide a proper compression of the fire-seal disposed between the mast and the maintenance half-cowl, thereby making even more difficult this closure of the half-cowl, which tends to fall under the effect of its own weight, while the second operator closes the tension locks.

Afterwards, these operations of opening and closing the maintenance half-cowls turn out to be quite particularly dangerous for the operator.

Indeed, the propulsion unit object of FIGS. 3 and 4 is intended to be directly mounted on the fuselage of the aircraft.

SUMMARY

The present disclosure provides an aircraft propulsion unit comprising:

a turbojet engine;

a lateral mast, intended to be directly connected to the fuselage of said aircraft, said lateral mast being positioned at about 90° or at about 270° with respect to a substantially vertical midplane of said propulsion unit when said propulsion unit is connected to the fuselage of the aircraft; and a nacelle mounted on said lateral mast and surrounding said turbojet engine, the nacelle comprising:

an upstream section, comprising an air inlet of the nacelle;

a downstream section, which can accommodate a thrust reverser device; and a middle section, downstream of said upstream section and upstream of said downstream section, comprising two fan half-cowls, surrounding a fan casing of said turbojet engine and being intended, when said half-cowls are in a closure position, to define an aerodynamic continuity between said upstream and downstream sections of the nacelle, said fan half-cowls including at least one maintenance half-cowl positioned under the substantially horizontal midplane of the nacelle, movable between said closure position and an opening position enabling access to the turbojet engine for maintenance operations on the turbojet engine;

said propulsion unit being remarkable in that said nacelle includes at least one standby lock, designed to hold said maintenance half-cowl in an intermediate position between said closure and opening positions.

Thus, by equipping the nacelle of the propulsion unit with a standby lock intended to hold the maintenance half-cowl in an intermediate position between the closure and opening positions, holding of the maintenance half-cowl in an intermediate position between the closure position and the opening position allows inhibiting the maintenance half-cowl falling by gravity, under the effect of its own weight.

When an operator wishes to open the maintenance half-cowl in order to carry out maintenance operations on the turbojet engine, the operator positions the maintenance half-cowl in a standby position, intermediate between the closure position and the opening position.

Afterwards, the operator alone can unlock the tension and shear locks, the half-cowl being held in the standby position by the standby lock.

Thus, thanks to the present disclosure, only one single operator can open such a maintenance half-cowl.

When an operator wishes to close the maintenance half-cowl once the maintenance of the turbojet engine is finished, the operator displaces the half-cowl from its opening position towards its standby position, intermediate between its final closure position.

Holding of the maintenance half-cowl in this standby position, obtained thanks to the standby lock, allows, on the one hand, inhibiting the cowl falling by gravity under the effect of its own weight during the closure phase.

Thus, the operator alone, who has proceeded with the displacement of the cowl from its opening position towards its standby position, can close the tension locks, and then the shear locks and, on the other hand, firmly compress the fire-seal present between the mast and the maintenance half-cowl.

Thus, thanks to the present disclosure, one single operator can be able to close such a maintenance half-cowl.

According to an advantageous arrangement of the propulsion unit of the present disclosure, the nacelle comprises a device for locking said half-cowls in the closure position, said locking device comprising:

at least one tension lock, designed to fasten said half-cowls on said lateral mast; and at least one shear lock, designed to fasten said half-cowls on at least one of the upstream and downstream sections of the nacelle and intended to provide a force path in case of breakage of said at least one tension lock, said shear lock comprising:

a shear pin, and a shear receptacle, mounted on at least one of the upstream and downstream sections of the nacelle, comprising a shear latch cooperating with the shear pin when said half-cowls are in the closure position;

said propulsion unit being remarkable in that the standby lock of the nacelle includes:

a standby pin, and a standby latch, mounted on the shear receptacle, designed to cooperate with said standby pin.

Thus, by providing for mounting the standby latch of the standby lock on the shear receptacle of the shear lock, it is possible to limit the space for the integration of the standby lock of the present disclosure into the nacelle. This arrangement is particularly advantageous in the context of the present disclosure where the nacelles are intended to be directly connected to the fuselage of an aircraft and not to hang from the wings of the aircraft, these nacelles having significantly reduced dimensions compared to nacelles hanging from the wings of the aircraft.

According to another advantageous arrangement of the propulsion unit of the present disclosure, the standby pin of the standby lock is constituted by the shear pin of the shear lock.

Thus, thanks to the present disclosure, it is possible to obtain a full combination of the standby lock and of the shear lock. This arrangement is very interesting in terms of reduction of the bulk inside the nacelle.

According to other advantageous arrangements of the propulsion unit of the present disclosure:

the distance between a substantially horizontal midplane of said nacelle when said nacelle is mounted on the lateral mast and the standby latch is smaller than the distance between said substantially horizontal midplane and the shear latch;

the shear receptacle includes a ramp intended to constrain the standby pin between a deployed position and a retracted position during a displacement of the maintenance half-cowl from said opening position towards said closure position;

the standby latch includes a groove defining a hemicylinder;

the standby pin includes a longitudinal axis substantially parallel to a longitudinal axis of the nacelle;

the shear receptacle is fastened on a rear frame of the air inlet of the nacelle; and/or the maintenance half-cowl is positioned under the substantially horizontal midplane of said nacelle when said nacelle is mounted on the lateral mast.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

In the description and the claims, the terms "upstream" and "downstream" should be understood with respect to the circulation of the air flow inside the propulsion unit formed by the nacelle and the turbojet engine.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 5:
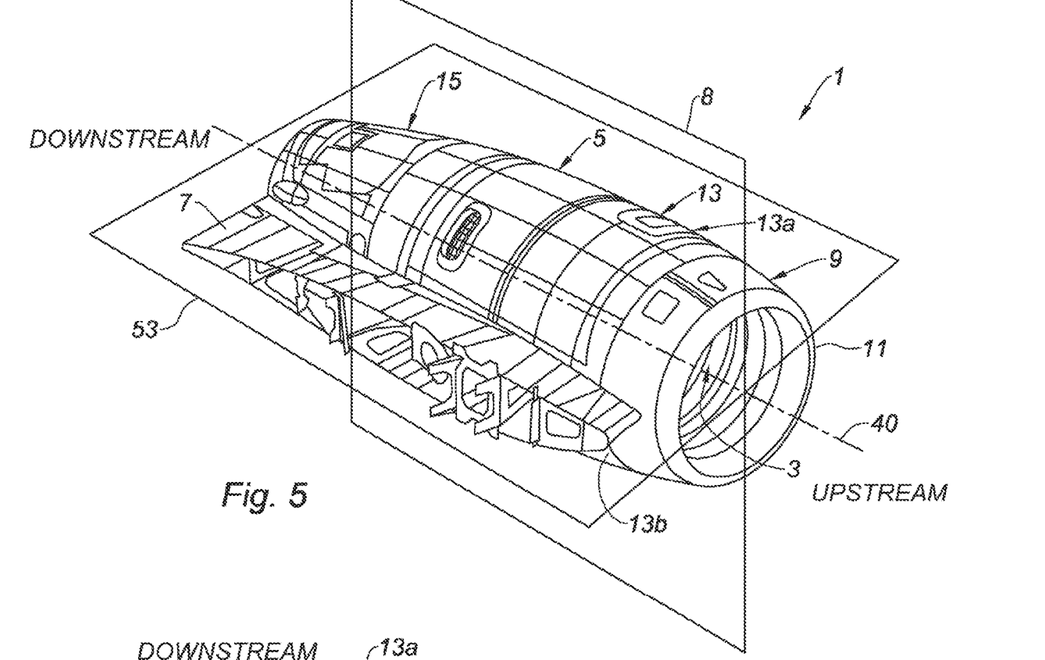
FIG. 5 is an isometric view of a propulsion unit, in the operation position, intended to be connected to the fuselage of an aircraft, according to the present disclosure.

Referring to FIG. 5, illustrating the propulsion unit 1 according to the present disclosure, with a design similar to the propulsion unit 201 object of FIGS. 3 and 4, that is to say that it provides a propulsion unit intended to be directly connected to the fuselage of an aircraft, generally used to equip short-haul and medium-haul type airplanes.

The propulsion unit 1 comprises a turbojet engine 3 and a nacelle 5, which receives the turbojet engine.

The propulsion unit 1 further includes a lateral mast 7 intended to be directly connected to the fuselage (not represented) of the aircraft.

On the contrary of the vertical mast 107 object of FIGS. 1 and 2, positioned at 12 O'clock in the propulsion unit 101 and intended to hang under a wing of the aircraft, the lateral mast 7 is intended to be directly connected to the fuselage of the aircraft. To this end, the mast 7 is positioned at "9 O'clock" in the propulsion unit or, for a propulsion unit symmetrical to the propulsion unit 1 with respect to the fuselage of the aircraft, positioned at "3 O'clock" in the propulsion unit.

In other words, the lateral mast 7 is positioned at about 90° or at about 2700 with respect to a substantially vertical midplane 8 of the propulsion unit 1 when the propulsion unit 1 is connected to the fuselage of the aircraft.

The nacelle 5 has a tubular structure comprising an upstream section 9 defining an air inlet 11 upstream of the turbojet engine 3, a middle section 13 intended to surround a fan of the turbojet engine, a downstream section 15 which can accommodate a thrust reverser device, generally a door-type thrust reverser, and intended to surround the combustion chamber of the turbojet engine.

The middle section 13 of the nacelle 5 includes downstream of the air inlet 11 two fan half-cowls 13a, 13b surrounding a fan casing of the turbojet engine. Each fan half-cowl 13a, 13b is substantially hemicylindrical. The half-cowls 13a, 13b define, in a closure position as represented, an aerodynamic continuity between the air inlet 11 of the upstream section 9 of the nacelle 5 and the downstream section 15 of the nacelle.

Figure 6:
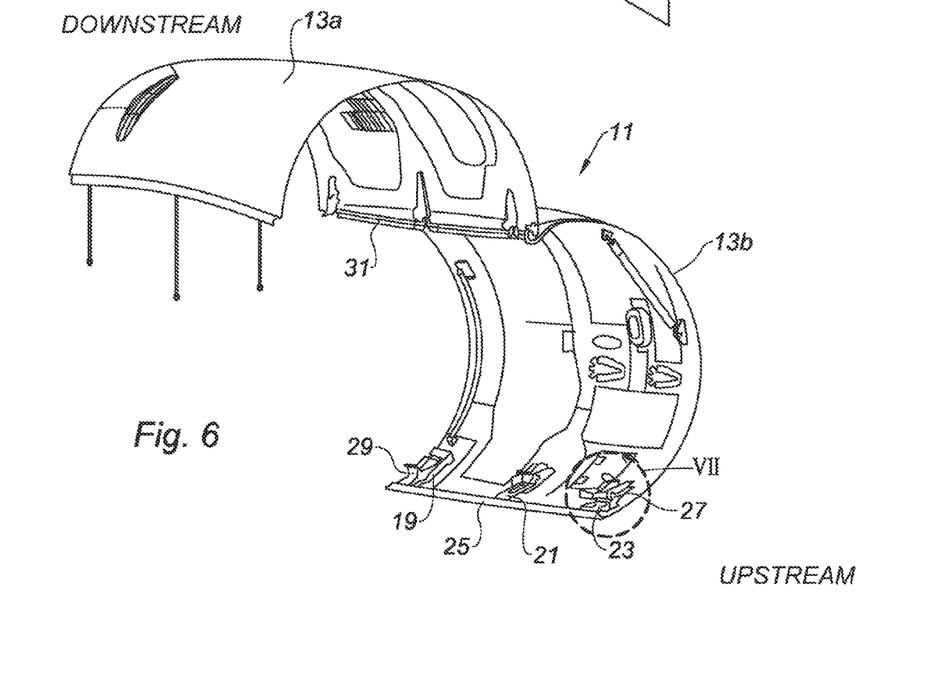
FIG. 6 is a partial view of the propulsion unit of FIG. 5 in the maintenance position.

In order to be able to carry out maintenance operations on the turbojet engine, one of the two half-cowls 13a, 13b is generally mounted movable between the closure position represented in FIG. 5 and an opening position represented in FIG. 6 to which reference is now made, enabling access to the turbojet engine.

In FIG. 6, there is represented the middle section 13 of the nacelle 5 of FIG. 5. For a better visibility, the upstream section 9 and the downstream section 15 of the nacelle, as well as the turbojet engine 3 and the mast 7, in FIG. 5, have been hidden.

In FIG. 6, the half-cowl 13a is in the closure position and the half-cowl 13b, also called "maintenance half-cowl" 13b, is in the opening position enabling access to the turbojet engine (not represented) to carry out maintenance operation thereon. The maintenance half-cowl 13b is positioned under a substantially horizontal midplane 5, when the nacelle is mounted on the lateral mast.

In the illustrated example, only the half-cowl 13b is mounted movable between the closure position and the opening position. According to a variant which is not represented, the two half-cowls 13a, 13b may be mounted movable between the closure position and the opening position.

The fan half-cowl 13b is kept closed on the mast 7 (shown in FIG. 5) thanks to a set of tension locks 19, 21, 23, disposed along the half-cowl 13b.

A fire-seal 25 is further positioned between the half-cowls 13a, 13b and the mast, in order to avoid that a fire starting in the propulsion unit propagates into the aircraft.

Moreover, a first shear lock 27 is generally disposed at the front of the movable half-cowl 13b. The shear lock 27 is designed to fasten the half-cowl 13b on the upstream section 9 of the nacelle.

A second shear lock 29, designed to fasten the half-cowl 13b on the downstream section 15 of the nacelle, is also generally disposed at the rear of the movable half-cowl 13b.

These shear locks 27, 29 are intended to provide a force path in case of breakage of one of the tension locks 19, 21, 23, in order to avoid scooping of the fan half-cowl in flight, this situation being catastrophic.

The fan half-cowl 13b can be opened radially by pivoting about a hinge line 31, positioned at "3 O'clock," a position diametrically opposite to that of the mast 7.

Figure 7:
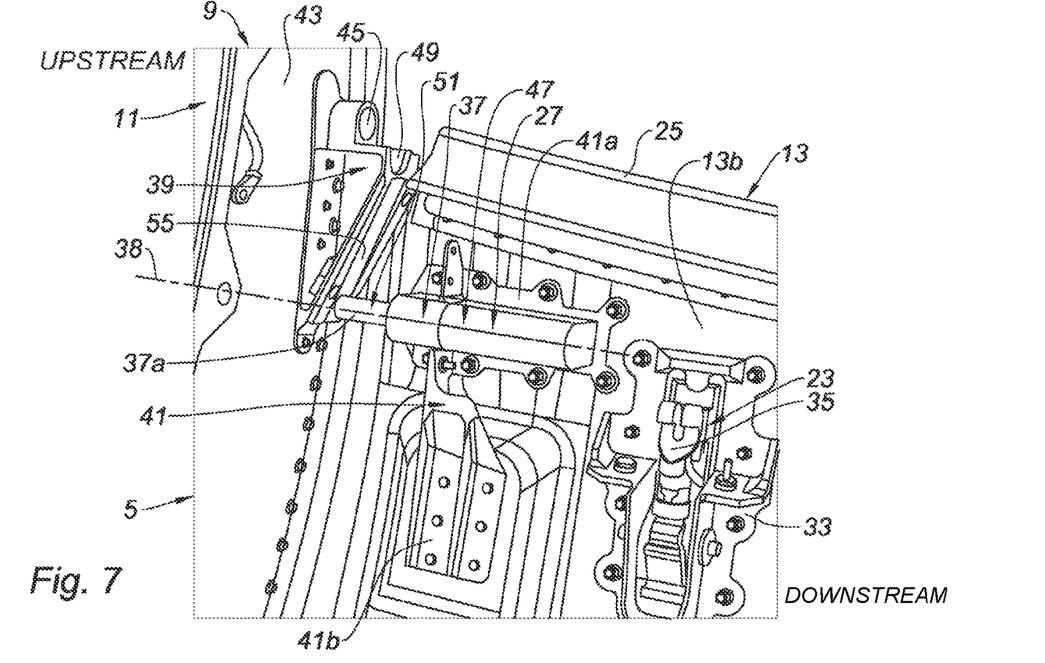
FIG. 7 is a detail view of the area VII of FIG. 5, and illustrates the nacelle according to the present disclosure viewed from the inside, in the maintenance open position, the view being centered on the junction between the middle section and the upstream section of the nacelle.

Referring to FIG. 7, a detail view of the area VII of FIG. 5 and illustrating the nacelle 5 of the present disclosure viewed from the inside thereof, in the maintenance open position, the view being centered on the junction between the middle section 13 and the upstream section 9 of the nacelle 5.

The maintenance half-cowl 13b receives at the level of its inner face, that is to say the face intended to come opposite the fan casing of the turbojet engine, the tension locks 19, 21, 23, disposed along the half-cowl 13b (only the tension lock 23 being shown in FIG. 7), as well as the shear locks 27, 29 (only the shear lock 27 being shown in FIG. 7).

The tension lock 23 is mounted on a support iron fitting 33 fastened on the inner face of the maintenance half-cowl 13b.

The tension lock 23 includes a tension pin 35, cooperating with a tension latch (not represented) which may be supported by the mast when the maintenance half-cowl is in the closure position.

The arrangement of the tension locks 19 and 21 is identical to that which has just been described for the tension lock 23.

The shear lock 27 provides a locking between the maintenance half-cowl 13b and the upstream section of the nacelle. The shear lock 27 is positioned upstream of the tension lock 23 and proximate to the latter.

The shear lock 27 includes a shear pin 37 and a shear receptacle 39.

As regards the shear pin 37, the latter is mounted on a support iron fitting 41 fastened on the inner face of the maintenance half-cowl 13b.

The support iron fitting 41 includes a first fastening subplate 41a, and a second fastening subplate 41b.

The second fastening subplate 41b is offset with respect to the first fastening subplate 41a, on the one hand in order to enable a proper integration of the shear lock 27 in the nacelle and, on the other hand, in order to take on the forces of the shear lock 27.

The shear pin 37 includes a portion 37a, movable between a deployed position and a retracted position. For example, the movable portion 37a adopts a cylindrical general shape. The longitudinal axis 38 of the shear pin 37 is substantially parallel to a longitudinal axis 40 of the nacelle (represented in FIG. 5).

As regards the shear receptacle 39, the latter is mounted on a rear frame 43 of the air inlet 11 of the upstream section 9 of the nacelle.

Figure 9:
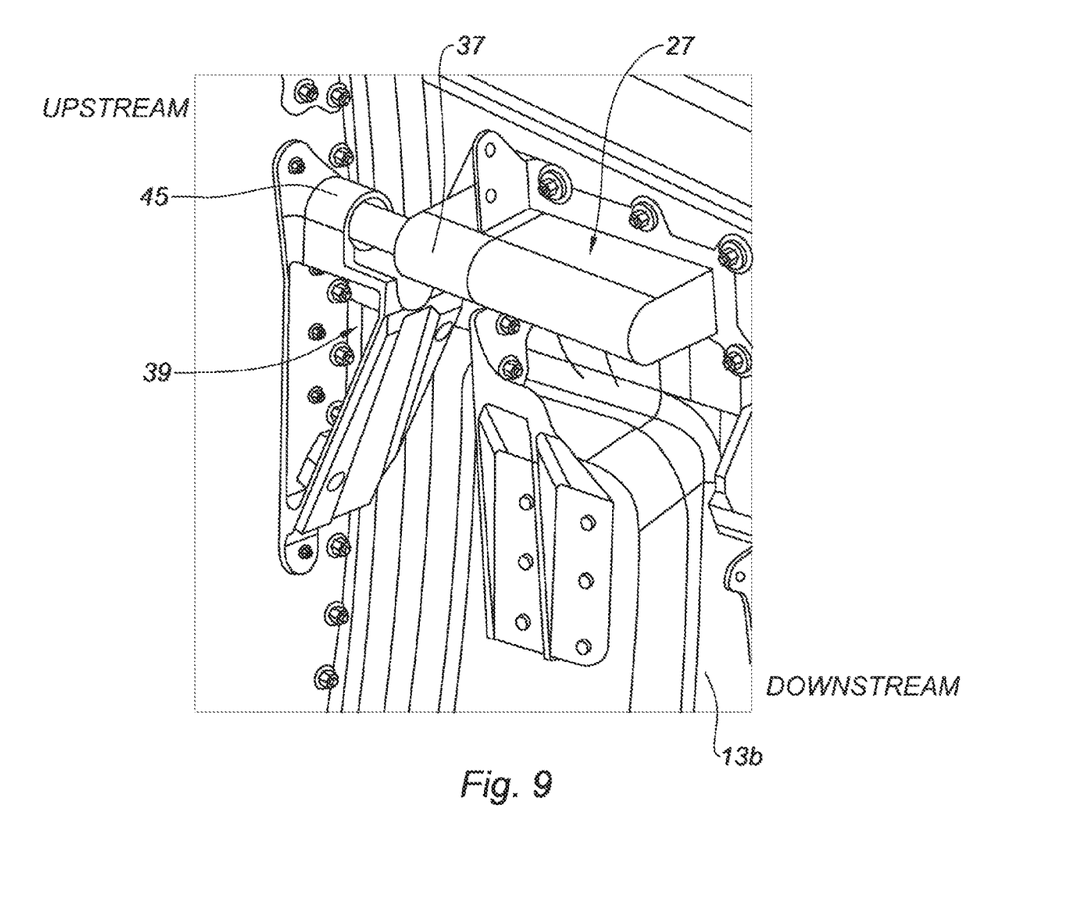
FIG. 9 is a detail view of the area VII of FIG. 5, the nacelle being represented in the operation closed position.

The shear receptacle includes a shear latch 45 which is intended to cooperate with the shear pin 37 when the maintenance half-cowl 13b is in the closure position (position represented in FIG. 9).

The arrangement of the shear lock 29, disposed at the downstream portion of the maintenance half-cowl 13b and the downstream section of the nacelle, is identical to that which has just been described for the shear lock 27. The shear lock 29 includes a shear pin mounted on a support iron fitting with a design similar to the support iron fitting 41, and whose arrangement opposite the maintenance half-cowl is identical to that described for the shear lock 27.

According to the present disclosure, the nacelle 5 includes a standby lock 47. The standby lock 47 includes a standby latch 49, designed to cooperate with a standby pin 51 of the standby lock 47 when the maintenance half-cowl is in a standby position represented in FIG. 8, an intermediate position between the opening position of FIG. 7 and the closure position of FIG. 9.

According to one form of the present disclosure, the standby latch 49 is mounted on the shear receptacle 39. The standby latch 49 includes a groove, defining a hemicylinder.

Nonetheless, it may be considered to dissociate the standby latch 49 from the shear receptacle 39, that is to say to offset the standby latch with respect to the shear receptacle 39.

In any case, the distance between a substantially horizontal midplane 53 (shown in FIG. 5) of the nacelle 5 when said nacelle is mounted on the lateral mast 7 (shown in FIG. 5) and the standby latch 49 is smaller than the distance between said substantially horizontal midplane and the shear latch 45.

According to an advantageous arrangement of the present disclosure, the standby pin 51 is constituted by the shear pin 37. Nonetheless, herein again, it may be considered to dissociate the standby pin 51 from the shear pin 37, that is to say to offset the standby pin 51 with respect to the shear pin 37.

The shear receptacle 39 includes a ramp 55, intended to constrain the standby pin 51 between a deployed position and a retracted position, during a displacement of the maintenance half-cowl 13b from its opening position represented in FIG. 7 towards its closure position represented in FIG. 9.

Figure 8:
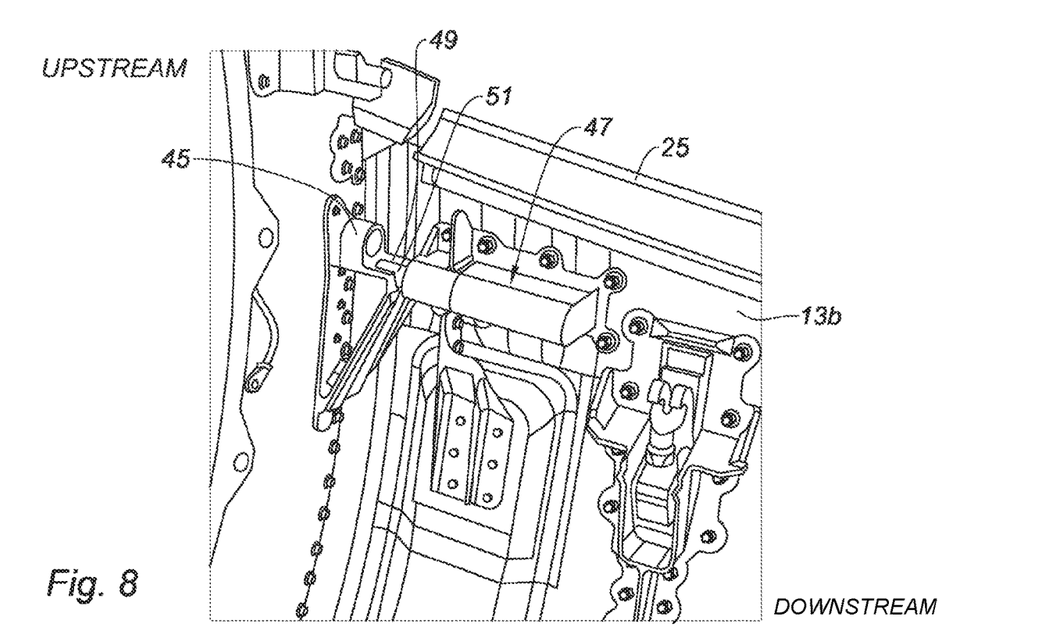
FIG. 8 is a detail view of the area VII of FIG. 5, the nacelle being represented in the standby position.

The operation of the present disclosure is now described, with reference to FIGS. 7 to 9.

When the nacelle is in operation, the maintenance half-cowl 13b is in the closure position represented in FIG. 9.

In this position, the tension locks are locked on the mast and the shear locks are locked on the upstream and downstream sections of the nacelle.

As regards the shear lock 27 shown in FIG. 9, the latter cooperates with the shear latch 45 of the shear receptacle 39.

When an operator wishes to carry out maintenance operations on the turbojet engine, the operator proceeds, at a first step, with the unlocking of the tension locks.

The half-cowl 13b is kept in the position represented in FIG. 9, thanks to the shear lock 27, whose shear pin 37 continues to cooperate with the shear latch 45.

During a second step illustrated in FIG. 8, the operator unlocks the shear lock 27 (as well as that lying downstream of the maintenance half-cowl), and positions the shear pin 37 (standby pin 51 when said pins are identical), so that it cooperates with the standby latch 49.

The maintenance half-cowl 13b is then neither in the closure position represented in FIG. 9, nor in the opening position represented in FIG. 7, but it lies in an intermediate position between these positions, a position also called standby position.

The distance between the longitudinal axis of the shear latch 45 and the longitudinal axis of the standby latch 49 is very small. It may be comprised between 10 millimeters and 20 millimeters, and in one example, the distance is 15 millimeters, which allows limiting the retaining force that the operator has to exert on the maintenance half-cowl 13b when the operator has released the shear pin 37 from its shear latch 45.

At this stage, the maintenance half-cowl is then supported only thanks to the cooperation of the standby pin 51 and of the standby latch 49.

When the operator wishes to make the maintenance half-cowl switch from its standby position represented in FIG. 8 into its opening position represented in FIG. 7, the operator releases the standby pin 51 of the standby latch 49.

On completion of the maintenance operations carried out on the turbojet engine, when an operator wishes to close the maintenance half-cowl, the operator proceeds, during a first step, with the displacement of the maintenance half-cowl from its opening position represented in FIG. 7 in the direction of its closure position represented in FIG. 9.

During this displacement, the ramp 55 of the shear receptacle 39 causes the displacement of the standby pin 51, from its deployed position represented in FIG. 7 up to its retracted position, until the standby pin cooperates with its standby latch 49, which position is represented in FIG. 8.

The maintenance half-cowl 13b is then neither in the opening position represented in FIG. 7 nor in the closure position represented in FIG. 9, it lies in its standby position, an intermediate position between these positions.

In such an intermediate position, the cowl is pre-constrained by the cooperation of the standby pin 51 with the standby latch 49. The maintenance half-cowl is then supported only thanks to the cooperation of the standby pin and of the standby latch.

Thus, the operator can exert a force on the maintenance half-cowl 13b, in order to firmly compress the fire-seal 25 on the mast.

The operator then closes, during this second step, the tension locks, so as to fix the maintenance half-cowl on the lateral mast.

During a third step, the operator displaces the shear pin 37 so that it cooperates with the shear latch 45.

The maintenance half-cowl is then in its closure position. In this position, the nacelle is operational, that is to say that it is no longer in the maintenance phase.

It goes without saying that the present disclosure is not limited to the forms of the nacelle and of the propulsion unit described hereinabove, which are intended only as illustrative examples, and thus encompasses on the contrary all variants involving the technical equivalents of the described means as well as their combinations if these fall within the scope of the present disclosure.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice; material, manufacturing, and assembly tolerances; and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An aircraft propulsion unit comprising:
   a turbojet engine;
   a lateral mast directly connected to a fuselage of the aircraft, said lateral mast being positioned at about 90° or at about 270° relative to a substantially vertical midplane of the propulsion unit when the propulsion unit is connected to the fuselage of the aircraft; and
   a nacelle mounted on the lateral mast and surrounding the turbojet engine, the nacelle comprising:
      an upstream section comprising an air inlet of the nacelle;
      a downstream section configured to accommodate a thrust reverser device; and
      a middle section disposed downstream of the upstream section and upstream of the downstream section, the middle section comprising two fan half-cowls surrounding a fan casing of the turbojet engine,
   wherein when the two fan half-cowls are in a closed position, the middle section defines an aerodynamic continuity between said upstream section and said downstream section of the nacelle, the two fan half-cowls including at least one maintenance half-cowl positioned under a substantially horizontal midplane of the nacelle and movable between the closed position and an open position enabling access to the turbojet engine for maintenance operations on the turbojet engine, and wherein the nacelle includes at least one standby lock to hold the at least one maintenance half-cowl in an intermediate position between the closed position and the open position, and a locking device for locking the two fan half-cowls in the closed position, the locking device comprising:

at least one tension lock to fasten the two fan half-cowls on the lateral mast; and at least one shear lock to fasten the two fan half-cowls on at least one of the upstream section and the downstream section of the nacelle and forming a force path for the at least one tension lock, the at least one shear lock comprising:

a shear pin extending from one of the fan half-cowls; and a shear receptacle mounted on at least one of the upstream section and the downstream section of the nacelle, the shear receptacle comprising a shear latch cooperating with the shear pin when the two fan half-cowls are in the closed position and a ramp slidably directing the shear pin to a deployed position when the two fan half-cowls are moved to the closed position, and wherein the at least one standby lock includes the shear pin and a standby latch, the standby latch being mounted on the shear receptacle between the shear latch and the ramp and cooperating with the shear pin extending from the one of the fan half-cowls, the shear pin being disposed in the standby latch when the maintenance half-cowl is in the intermediate position.

2. The propulsion unit of claim 1, wherein a distance between the substantially horizontal midplane of the nacelle, when the nacelle is mounted on the lateral mast, and the standby latch is smaller than a distance between the substantially horizontal midplane and the shear latch.

3. The propulsion unit of claim 1, wherein the ramp is configured to constrain a standby pin between the deployed position and a retracted position during a displacement of the at least one maintenance half-cowl from the open position towards the closed position.

4. The propulsion unit of claim 1, wherein the standby latch includes a groove defining a hemicylinder.

5. The propulsion unit of claim 3, wherein the standby pin includes a longitudinal axis substantially parallel to a longitudinal axis of the nacelle.

6. The propulsion unit of claim 1, wherein the shear receptacle is fastened on a rear frame of the air inlet of the nacelle.

7. The propulsion unit of claim 1, wherein the at least one maintenance half-cowl is positioned under the substantially horizontal midplane of the nacelle when the nacelle is mounted on the lateral mast.

8. An aircraft propulsion unit comprising:
a turbojet engine;
a lateral mast directly connected to a fuselage of the aircraft, said lateral mast being positioned at about 90° or at about 270° relative to a substantially vertical midplane of the propulsion unit when the propulsion unit is connected to the fuselage of the aircraft; and
a nacelle mounted on the lateral mast and surrounding the turbojet engine, the nacelle comprising:
an upstream section comprising an air inlet of the nacelle;
a downstream section configured to accommodate a thrust reverser device; and
a middle section disposed downstream of the upstream section and upstream of the downstream section, the middle section comprising two fan half-cowls surrounding a fan casing of the turbojet engine, wherein when the two fan half-cowls are in a closed position the middle section defines an aerodynamic continuity between said upstream section and said downstream section of the nacelle, the two fan half-cowls including at least one maintenance half-cowl positioned under a substantially horizontal midplane of the nacelle and movable between the closed position and an open position enabling access to the turbojet engine for maintenance operations on the turbojet engine, and wherein the nacelle includes at least one standby lock to hold the at least one maintenance half-cowl in an intermediate position between the closed position and the open position, and a locking device for locking the two fan half-cowls in the closed position, the locking device comprising:

at least one tension lock to fasten the two fan half-cowls on the lateral mast; and at least one shear lock to fasten the two fan half-cowls on at least one of the upstream section and the downstream section of the nacelle and forming a force path for the at least one tension lock, the at least one shear lock comprising:

a shear pin extending from one of the fan half-cowls; and a shear receptacle mounted on at least one of the upstream section and the downstream section of the nacelle, the shear receptacle comprising a shear latch cooperating with the shear pin when the two fan half-cowls are in the closed position and a ramp slidably directing the shear pin to a deployed position when the two fan half-cowls are moved to the closed position, wherein the at least one standby lock of the nacelle includes:

a standby pin; and a standby latch mounted on the shear receptacle between the shear latch and the ramp and cooperating with the standby pin, wherein the standby pin is offset with respect to the shear pin, wherein the standby pin is disposed in the standby latch when the maintenance half-cowl is in the intermediate position.

9. The propulsion unit of claim 1, wherein the at least one standby lock extends parallel to a longitudinal axis of the nacelle from the at least one maintenance half-cowl to at least one of the upstream section and the downstream section.

10. The propulsion unit of claim 8, wherein a distance between the substantially horizontal midplane of the nacelle, when the nacelle is mounted on the lateral mast, and the standby latch is smaller than a distance between the substantially horizontal midplane and the shear latch.

11. The propulsion unit of claim 8, wherein the ramp is configured to constrain the standby pin between the deployed position and a retracted position during a displacement of the at least one maintenance half-cowl from the open position towards the closed position.

12. The propulsion unit of claim 8, wherein the standby latch includes a groove defining a hemicylinder.

13. The propulsion unit of claim 11, wherein the standby pin includes a longitudinal axis substantially parallel to a longitudinal axis of the nacelle.

14. The propulsion unit of claim 8, wherein the shear receptacle is fastened on a rear frame of the air inlet of the nacelle.

15. The propulsion unit of claim 8, wherein the at least one maintenance half-cowl is positioned under the substantially horizontal midplane of the nacelle when the nacelle is mounted on the lateral mast.

16. The propulsion unit of claim 8, wherein the at least one standby lock extends parallel to a longitudinal axis of the nacelle from the at least one maintenance half-cowl to at least one of the upstream section and the downstream section.

\* \* \* \* \*